Patented Feb. 6, 1945

2,369,074

UNITED STATES PATENT OFFICE 2,369,074

STABILIZED CONVERSION CATALYST

Edgar C. Pitzer, Chicago, Ill., assignor to Standard Oil Company, Chicago, Ill., a corporation of Indiana No Drawing. Application February 9, 1942,
Serial No. 430,067

6 Claims. (Cl. 196—52)

This invention relates to an improved catalyst for the conversion of hydrocarbon oils and to a catalytic hydrocarbon conversion process employing the catalyst. One object of the invention is to provide a catalyst for the cracking of heavy hydrocarbon oils into lighter hydrocarbons, gasoline, etc., having a high activity as measured by the rate of gasoline production. Another object of the invention is to provide a catalyst having a long life as indicated by a high heat stability. A still more specific object of the invention is to improve the stability of silica-magnesia catalysts by the addition thereto of a minor amount of a stabilizing component.

One of the most effective catalysts heretofore discovered for the conversion of hydrocarbon oils and particularly for the cracking of gas oil and residual oils into lighter products is an active silica-magnesia composition. For this purpose silica gel, preferably in the form of hydrogel, may be intimately mixed with active magnesia. Mixing may be conveniently done in a ball mill and if dry silica gel is used, some water should be added. Magnesium oxide, resulting from the calcining of magnesite, for example, at temperatures of 1200 to 1600 or 2000° F. is suitable. In general, the silica forms the major component of such catalysts. If brucite or precipitated magnesium hydroxide is used, it should be ignited before mixing with the silica gel. A typical composition may be 25% MgO:75% $SiO_2$. However, compositions containing about 10% to 50% and usually about 15 to 30% of MgO may be employed. Magnesia activated by ignition or calcining at a temperature above 1000° F. and generally within the range of 1000 to 2000° F. is preferred and such a product whether prepared from magnesite, magnesium oxide or magnesium hydroxide will be referred to hereinafter as "calcined magnesite." A magnesia-silica catalyst of this type is described in U. S. Serial 317,404, filed February 5, 1940, now U. S. Patent 2,343,731.

One of the valuable properties of the silica-magnesia catalysts is the favorable product distribution obtained by their use, particularly with respect to carbon formation which is relatively low in relation to the gasoline production; also, the gasoline formed is characterized by a relatively high knock rating, of the order of 78 to 82 A. S. T. M., when employing a Mid-Continent gas oil charging stock. A disadvantage of the silica-magnesia catalysts, however, is their relatively low heat stability as indicated by the progressive loss of catalytic activity while in use and after numerous regenerations. In the regeneration of the catalyst after each run period, which may last from 10 minutes to several hours, the catalyst is blown with air to remove carbonaceous deposits by combustion. In this operation it is difficult to control the temperature closely although efforts are generally made to maintain the regeneration temperature within the limits of 900 to 1200° F. by the use of various cooling methods. A study of the behavior of a large number of cracking catalysts on repeated use in life tests has indicated that those catalysts with long life characteristics are also less affected by heating to high temperatures, for example, to temperatures of 1300 to 1400° F. and higher.

I have now discovered that the temperature stability of silica-magnesia catalysts is considerably increased by the addition of a small proportion of lanthanum oxide, preferably during the preparation of the catalyst. A minor amount only of lanthanum oxide is required for the purpose, generally from 0.1 to 5 or 10%, 1 to 2% being a typical amount. It is not understood how the lanthanum oxide effects the increased temperature stability and in fact it is not clear why certain catalysts are more heat-stable than certain other catalysts. In the case of some catalysts containing ingredients of relatively low fusion point it appears that incipient fusion may account for the loss of activity. In the case of other catalysts it appears that the oxide ingredients may be present in a meta-stable form in the fresh catalysts and on heating, they undergo an allotropic transformation into a form of lesser catalytic activity. Possibly in the case of the silica-magnesia catalysts the lanthanum oxide may inhibit this sort of transformation.

The following is an example of the preparation of a silica-magnesia-lanthana catalyst in accordance with my invention. A slurry of 4760 grams of silica hydrogel in 10 liters of water was prepared by grinding in a ball mill for 2 hours. Forty-three (43) grams of lanthanum nitrate, $La(NO_3)_3.6H_2O$, was added to the mixture and stirred for ½ hour and then 200 grams of active magnesia was added. After stirring for 1 hour the mixture was filtered to a hard cake, dried at 150° F., then heated slowly to 1150° F. and crushed to 6–14 mesh. The resulting catalyst had a composition of 22 to 25% MgO; 2% $La_2O_3$ and the remainder $SiO_2$.

Three cracking runs made with this catalyst gave the following average results:

| | |
|---|---|
| Stock | 35° MC gas oil |
| Temperature | 925° F. |
| Space velocity | 1 vol. of oil hr. vol. of catalyst |
| Process time | 2 hours |
| Products: | |
| Gasoline | 46.3% (vol.) |
| Excess $C_4$ | 9.1% (vol.) |
| Dry gas | 10.1% (wt.) |
| Carbon | 2.6% (wt.) |
| Gasoline knock rating | 78.1 A. S. T. M. |

Comparative results with a silica-magnesia catalyst, identical in every respect but without the lanthanum oxide, gave as an average only 43.1% of gasoline under the same conditions showing that the lanthanum definitely promoted the conversion activity of the silica-magnesia catalyst.

To determine the effect of lanthanum oxide on heat stability, comparison was made using a magnesia-silica catalyst with and without the stabilizer. The following data show the effect of the lanthanum oxide in increasing the heat stability of the silica-magnesia catalyst. Samples of catalyst with and without $La_2O_3$ were heated at successively higher temperatures for 24 hour periods, in increments of 100° F. and tested after each heat treatment in the conversion of 35.5° MC virgin gas oil at 925° F. and a space velocity of 1 v./h./v. for 1 hour periods. Total conversion is the difference between the amount of gas oil treated and the amount of gas oil recovered.

| Catalyst | Total conversion, percent | | | |
|---|---|---|---|---|
| | Initial | After heating 24 hrs. at— | | |
| | | 1200° F. | 1300° F. | 1400° F. |
| $SiO_2=MgO$ (22 to 25% MgO) | 65 | 66 | 63 | 21 |
| $SiO_2=MgO$ (22 to 25% MgO) +2% $La_2O_3$ | 66 | 63 | 57 | 50 |

These results show no particular effect of the lanthana until a temperature of 1400° F. was reached when its stabilizing effect became quite pronounced.

In the operation of my process using a lanthanum catalyst, I prefer to employ temperatures within the range of about 750 to 1050° F. and space velocities between about 0.1 and 10 volumes of liquid feed per hour per volume of catalyst, preferably about 0.5 to 3 v./h./v. In general, the process time during which the catalyst is in use between regenerations will be about .5 minutes to 300 minutes, preferably about 30 minutes to 2 hours. Although the data show the catalyst is relatively stable at temperatures of 1400° F., it is preferred to maintain the temperature of regeneration below 1200° F. in order to obtain maximum catalyst life. However, higher regeneration temperatures may be employed with the lanthanum catalyst than with the straight silica-magnesia catalyst containing no stabilizer.

Although I have described the addition of lanthanum oxide stabilizer particularly for silica-magnesia catalysts, there are indications that it is also of value in certain other silica catalysts, particularly the silica-alumina and silica-zirconia catalysts. In the case of the latter catalysts, however, the problem of increasing heat stability is relatively less important than in the case of the silica-magnesia catalysts inasmuch as the former catalysts are inherently more stable at high temperatures.

My catalyst may be used in the various types of hydrocarbon conversion processes, whether fixed bed, moving bed, suspended powder, etc. After regeneration, the catalyst is recycled from the regeneration zone to the reaction zone in the case of moving bed or suspensoid conversion. When a fixed bed is employed, the catalyst is regenerated in situ with suitable purging between process and regeneration phases of the cycle.

In the preparation of the catalyst, the lanthanum may be added as the hydroxide, the oxide, or a suitable salt which is decomposed in the body of the catalyst. Lanthanum hydroxide may be precipitated from its salts in the presence of the silica-magnesia by adding ammonia or other suitable base to the mixture. The lanthanum may be added to the silica gel and the impregnated silica gel may then be commingled with the magnesia or alternatively the magnesia may be impregnated with the lanthanum after which the impregnated magnesia may be commingled with the silica gel. Still a third method is to add the lanthanum in the form of a solution of one or more of its compounds to a mixture of the silica-magnesia catalyst base.

Having thus described my invention what I claim is:

1. The process of converting hydrocarbon oils which comprises subjecting the oils at conversion temperature to the action of a solid, porous catalyst comprised of a mixture of active silica and magnesia with a minor proportion of lanthanum oxide as a heat stabilizing agent, the amount of said lanthanum oxide being not over 10 percent of the combined weight of the silica, magnesia and lanthanum oxide.

2. The process of converting hydrocarbon oils which comprises subjecting the oils at conversion temperature to the action of a solid porous catalyst comprised of a mixture of active silica and magnesia with about 0.1 to 5 percent of lanthanum oxide as a heat stabilizing agent.

3. The process of converting heavy hydrocarbon oils into gasoline which comprises subjecting the vapors of said oils at a conversion temperature of about 750 to 1050° F. to the action of a solid conversion catalyst comprising a mixture of active silica and calcined magnesia in which the silica predominates, and lanthanum oxide in the proportion of about 0.1 to 10% of the weight of the catalyst.

4. The process of claim 3 wherein the magnesia constitutes about 15 to 30% of the catalyst.

5. A hydrocarbon conversion catalyst of high activity and heat stability consisting essentially of active silica and magnesia containing about 10 to 50% of MgO and 0.1% to 5% of $La_2O_3$ as a heat stabilizer.

6. A silica-magnesia hydrocarbon conversion catalyst consisting essentially of a major proportion of silica in the form of silica gel and a minor proportion of magnesia in the form of calcined magnesite intimately associated therewith and about 0.1 to 5% of lanthanum oxide as a promoter and stabilizer.

EDGAR C. PITZER.